(12) United States Patent
Park et al.

(10) Patent No.: US 12,079,972 B2
(45) Date of Patent: Sep. 3, 2024

(54) METHOD AND APPARATUS BASED ON SCENE DEPENDENT LENS SHADING CORRECTION

(71) Applicant: Samsung Electronics Co., Ltd., Gyeonggi-do (KR)

(72) Inventors: Seongjun Park, San Jose, CA (US); Shuangquan Wang, San Diego, CA (US); Dongwoon Bai, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 360 days.

(21) Appl. No.: 17/572,223

(22) Filed: Jan. 10, 2022

(65) Prior Publication Data
US 2022/0375044 A1 Nov. 24, 2022

Related U.S. Application Data

(60) Provisional application No. 63/187,013, filed on May 11, 2021.

(51) Int. Cl.
| | |
|---|---|
| *G06K 9/40* | (2006.01) |
| *G06T 5/40* | (2006.01) |
| *G06T 5/80* | (2024.01) |
| *H04N 23/88* | (2023.01) |

(52) U.S. Cl.
CPC ............... *G06T 5/80* (2024.01); *G06T 5/40* (2013.01); *H04N 23/88* (2023.01)

(58) Field of Classification Search
CPC ... G06T 5/80; G06T 5/40; G06T 2207/10004; G06T 2207/10024; G06T 5/20; G06T 7/90; H04N 23/88
See application file for complete search history.

(56) References Cited

U.S. PATENT DOCUMENTS

| | | | | |
|---|---|---|---|---|
| 8,605,167 | B2 * | 12/2013 | Cote | H04N 23/70 348/223.1 |
| 9,743,057 | B2 * | 8/2017 | Cote | H04N 25/134 |
| 11,218,630 | B2 * | 1/2022 | Douady | H04N 9/643 |
| 2019/0313005 | A1 | 10/2019 | Kuang et al. | |
| 2020/0396356 | A1 | 12/2020 | Hu et al. | |

FOREIGN PATENT DOCUMENTS

| | | | | |
|---|---|---|---|---|
| CN | 108156435 | | 6/2018 | |
| CN | 108156435 | A * | 6/2018 | ............ H04N 9/045 |
| JP | 2011160183 | | 8/2011 | |
| WO | WO-2019104047 | A1 * | 5/2019 | ............ G06T 5/009 |

* cited by examiner

*Primary Examiner* — Xin Jia
(74) *Attorney, Agent, or Firm* — The Farrell Law Firm, P.C.

(57) ABSTRACT

A method of performing scene-dependent lens shading correction (SD-LSC) is provided. The method includes collecting scene information from a Bayer thumbnail of an input image; generating a standard red green blue (sRGB) thumbnail by processing the Bayer thumbnail of the input image to simulate white balance (WB) and pre-gamma blocks; determining a representative color channel ratio of the input image based on the scene information and the sRGB thumbnail; determining an ideal grid gain of the input image based on the representative color channel ratio and a grid gain of the input image; merging the ideal grid gain and the grid gain of the input image to generate a new grid gain; and applying the new grid gain to the input image.

20 Claims, 12 Drawing Sheets

METHOD AND APPARATUS BASED ON SCENE DEPENDENT LENS SHADING CORRECTION

PRIORITY

This application is based on and claims priority under 35 U.S.C. § 119(e) to U.S. Provisional Patent Application Ser. No. 63/187,013, filed on May 11, 2021 in the United States Patent and Trademark Office, the entire contents of which is incorporated herein by reference.

FIELD

The present disclosure generally relates to reducing image artifacts.

BACKGROUND

Undesired lens shading (e.g., vignetting) may appear as a brightness level drops at a periphery of an image compared to a center of an image. Due to lack of illumination, corner areas in lenses may appear darker compared to center areas. This unexpected darkness is corrected by increasing a brightness level at corners to compensate for the amount of insufficient illumination. Vignetting may be used as an artistic effect, but it is often considered to be an artifact that reduces the image quality in a camera system.

In general, vignetting correction can be categorized into two types. The first type is a grid look up table (LUT)-based correction, and the second type is a functional approximation to a distribution of correction factors.

To perform LUT-based correction, a uniform white (or gray) plane is captured in a dark room to present a shading profile of a lens. The shading profile is intersected with grid sections, and a finite number of point values representing an anti-shading profile gain are stored in an LUT, and for all other points in the frame, the shading gains are computed through interpolation with the surrounding grid points.

Functional approximation correction can be performed many different ways, such as using polynomials, empirical exponential functions, and/or hyper cosine functions. Equation (1), below, is an example of an approximated function M that uses a 6th-order polynomial a calculated using a radius r from the center of an image. The type of the function depends on the lens design.

$$M(r)=1+\alpha_2 r^2+\alpha_4 r^4+\alpha_6 r^6 \quad (1)$$

Most lens shading correction (LSC) schemes utilize a factory calibration setting by capturing a uniform gray plane in a darkroom. The factory calibration setting is designed to achieve a static luminance level from the center of the image to each edge or corner of the image. The factory calibration setting, however, cannot completely remove color artifacts when customers take pictures of real scenes under various lighting conditions. For example, the images in FIG. 1 have visible chroma shading artifacts, even though the factory calibration setting was applied. In terms of brightness, the images have no problems in that there is no luminance drop throughout the entire frame. In terms of color rendering, the images fail to maintain a static red, green, blue (RGB) ratio, showing some areas more greenish or more reddish. For example, (a) of FIG. 1 shows the image to have an undesired green tint at the center area of the image. Additionally, (b) of FIG. 1 shows the image to include undesired red tints in the corners of the image. In addition, (c) of FIG. 1 shows the center area of the image to have an undesired red tint to the image.

SUMMARY

The present disclosure has been made to address the above-mentioned problems and disadvantages, and to provide at least the advantages described below.

According to an aspect of the disclosure, a method of performing scene-dependent LSC (SD-LSC) includes collecting scene information from a Bayer thumbnail of an input image; generating a standard red green blue (sRGB) thumbnail by processing the Bayer thumbnail of the input image to simulate white balance (WB) and pre-gamma blocks; determining a representative color channel ratio of the input image based on the scene information and the sRGB thumbnail; determining an ideal grid gain of the input image based on the representative color channel ratio and a grid gain of the input image; merging the ideal grid gain and the grid gain of the input image to generate a new grid gain; and applying the new grid gain to the input image.

According to another aspect of the disclosure, a system for performing SD-LSC includes a memory configured to store instructions and a processor. The processor is configured to execute the instructions stored in the memory which, upon execution cause the processor to collect scene information from a Bayer thumbnail of an input image; generate an sRGB thumbnail by processing the Bayer thumbnail of the input image to simulate WB and pre-gamma blocks; determine a representative color channel ratio of the input image based on the scene information and the sRGB thumbnail; determine an ideal grid gain of the input image based on the representative color channel ratio and a grid gain of the input image; merge the ideal grid gain and the grid gain of the input image to generate a new grid gain; and apply the new grid gain to the input image.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
FIG. 1 illustrates images with visible chroma shading artifacts that exist in prior art.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1st," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

Color rendering is one of the most important factors for the beauty of photos, but some images suffer from inconsistent color rendering due to the physical limitations of optical lenses in cameras. Luminance fall-off may be enhanced by an offline factory calibration, but it is hard to control the chrominance shading without real-time adjustments. This disclosure provides embodiments which improve lens shading performance.

For example, the present disclosure utilizes thumbnail statistics generated at every frame in a camera preview. The thumbnail statistics may include all of the color information of a scene. Based on the scene, the ideal LSC gain may be found and then combined with the original gain in to improve image quality.

Figure 2:
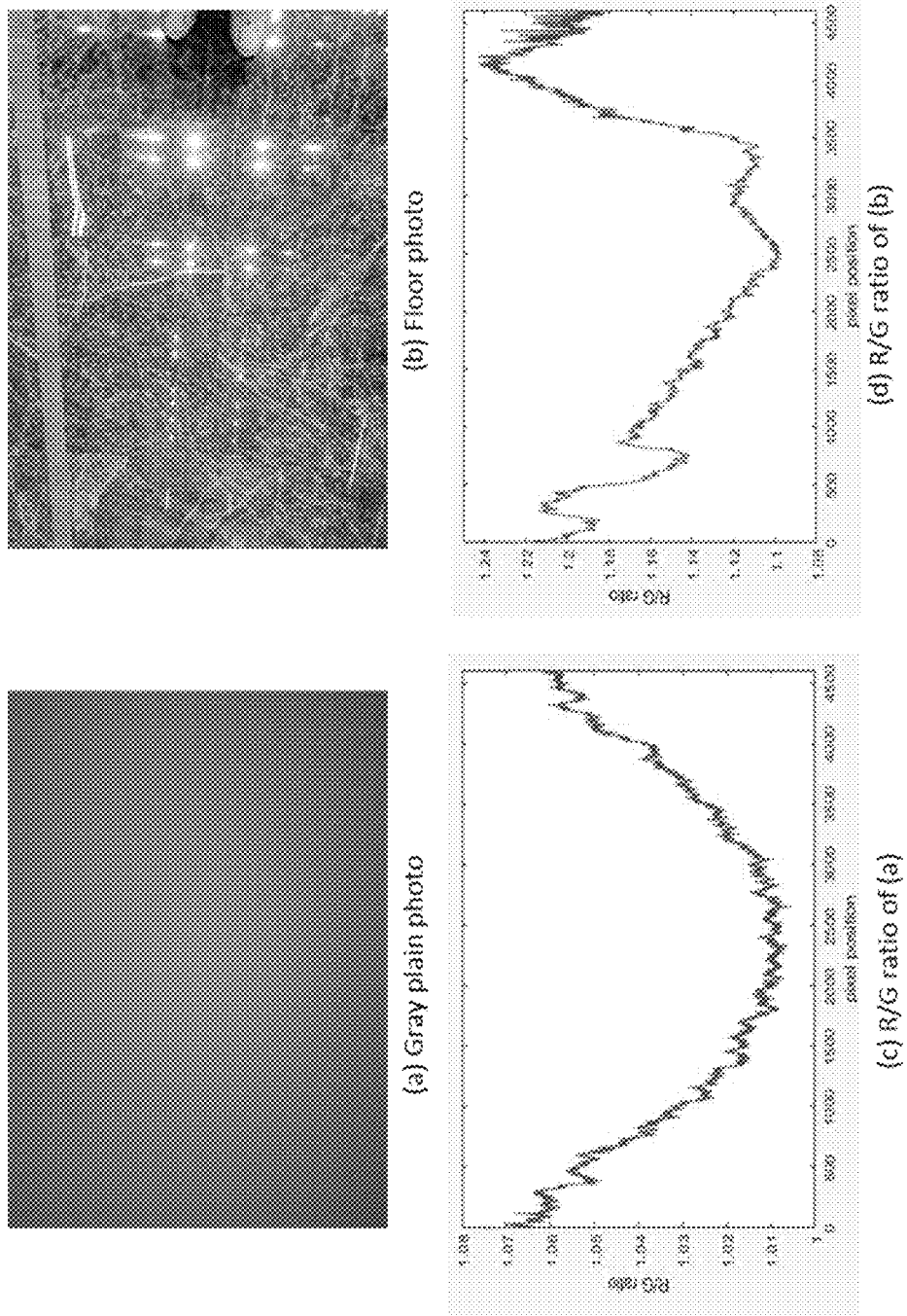
FIG. 2 illustrates examples of chroma shading artifacts and corresponding color ratios, according to an embodiment.

FIG. 2 illustrates examples of chroma shading artifacts and corresponding color ratios, according to an embodiment.

Referring to FIG. 2, an R/G ratio is obtained by taking the average of the pixel intensities of R divided by G's pixel intensities along the vertical direction of an image. Since both photo (a) and photo (b) of FIG. 2 have more red color as they approach the periphery, central pixels have small R/G ratios. Graph (c) of FIG. 2 is a graph of an R/G ratio of photo (a) of FIG. 2, which is equivalent to a plain gray chart in a darkroom. Graph (c) has a convex "U" pattern, however the R/G ratio should ideally appear as a flat line (e.g., a constant R/G ratio). Graph (d) of FIG. 2 is an R/G ratio of photo (b) of FIG. 2. Although photo (b) includes many irregularities (e.g., unlike photo (a), photo (b) includes dynamic changes in pixel values), the R/G ratio in graph (d)

also resembles the convex pattern, similar to graph (c) (e.g., due to the red color along the periphery of photo (b)).

When the pixel intensities are adjusted so graph (c) and graph (d) arrive at a flat curve, the chroma artifact is reduced or eliminated completely. The algorithm introduced in this disclosure causes an R/G ratio and a B/G ratio to be as balanced as possible, without degrading the quality of the original color rendering, by applying a concept of a SD-LSC grid gain. Conceptually, SD-LSC is summarized in FIG. 3.

Figure 3:
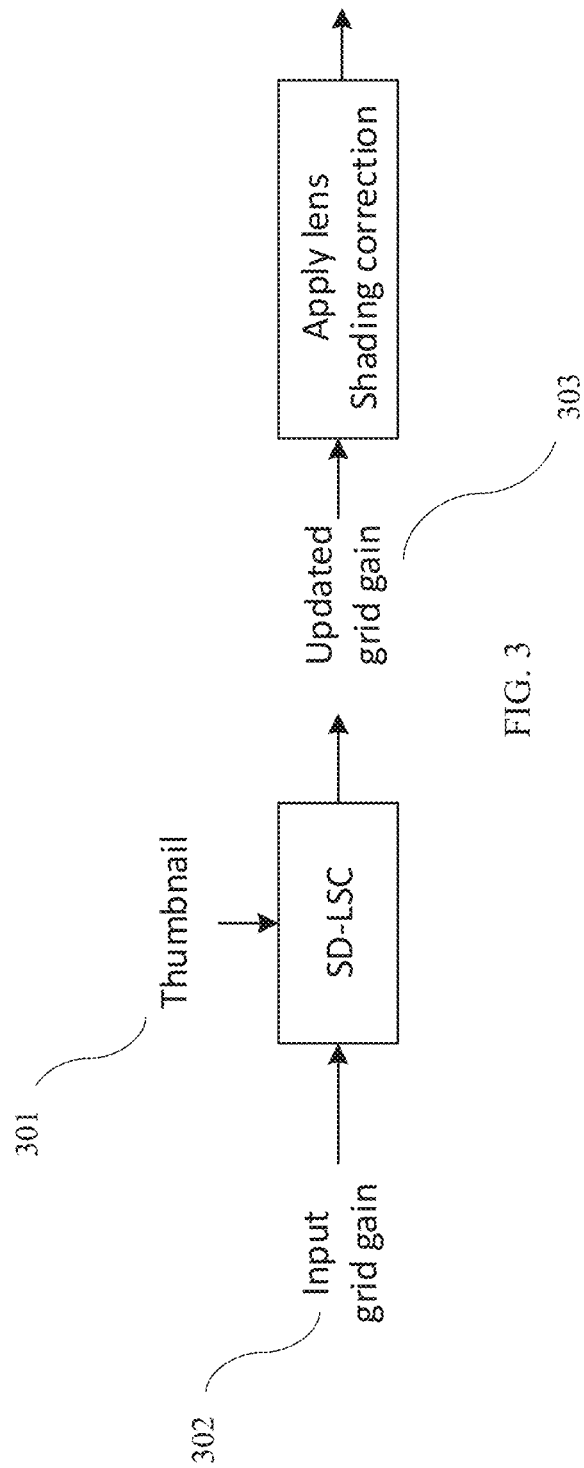
FIG. 3 is a block diagram illustrating implementation of SD-LSC, according to an embodiment.

FIG. 3 is a block diagram illustrating implementation of SD-LSC, according to an embodiment.

Grid gains (e.g., gain values assigned to regions of an image that is segmented via a grid) may be dynamically updated at every frame according to captured scenes, which can be used to partially control gains at the area(s) having artifacts, rather than controlling the whole image.

Referring to FIG. 3, to acquire scene information, the SD-LSC may utilize a small size thumbnail 301 generated from the previous frame in the preview mode of a camera image signal processor (ISP). In addition, an input grid gain 302 of the present frame may be input to the SD-LSC. Applying SD-LSC, an updated grid gain 303 may be obtained based on the previous frame's thumbnail 301 and the present frame's input grid gain 302. The updated grid gain 303 may be applied to an image.

Most LSC techniques are static approaches. Gains are assigned from pre-determined values that are calibrated in a factory. Although they may reflect various capture conditions including brightness levels, color temperature, or lens positions, they have limitations to overcome the color shading artifacts in that those artifacts unexpectedly occur more often under certain scene patterns. Because SD-LSC calculates new gains depending on preview images (e.g., thumbnail 301), it allows for the reflection of dynamically varying capture conditions in real time no matter what type of scene is presented. Newly updated LSC gains guarantee better color rendering and higher real-world fidelity, which improves user satisfaction.

Many different types of LSC models may be used, but these models may generally be simplified as shown in Equation (2).

$$I_{LSC_{out}}(x,y,c)=I_i(x,y,c)G(x,y,c), G \geq 1 \qquad (2)$$

In Equation (2), (x,y) is a pixel position and c is a color channel. The gain G is composed of factory calibrated values to compensate for a static luminance level regardless of pixel position. Because this LSC model works independently without interaction among color channels, it is impossible to detect color deviance producing color shading.

Most camera ISPs include the ability to apply auto focus, auto exposure, and auto white balance statistical algorithms to estimate ideal color rendering conditions based on a statistical thumbnail of a preview frame. This is called a 3A operation. The results of a 3A operation may be referred to as "scene information". The 3A operation and thumbnail creation are performed in the Bayer domain to achieve real-time processing. For example, applying auto focus in the Bayer domain may be referred to as applying a "3A statistical algorithm". Similarly, applying auto exposure and/or auto white balance in the Bayer domain may each be referred to as applying a "3A statistical algorithm".

The color shading is observed by users when an ISP generates a final sRGB output (e.g., a Joint Photographic Experts Group (JPEG) file). An aspect of SD-LSC is to anticipate the chroma shading using the thumbnail generated from the previous frame. However, some artifacts in the Bayer domain and visible when in the sRGB domain, may not be observed in the thumbnail. To determine how RGB colors are distributed, SD-LSC performs a simple sRGB process by simulating WB and pre-gamma blocks. The combination of LSC, WB, and pre-gamma may be expressed as shown in Equation (3).

$$I_o(x,y,c)=(W(c)G(x,y,c)I_i(x,y,c))^{1/2.2} \qquad (3)$$

In Equation (3), $I_i$ is the LSC input, $I_o$ is the pre-gamma output, W is the WB gain, and pre-gamma is assumed for the typically used power of 1/2.2.

Figure 4:
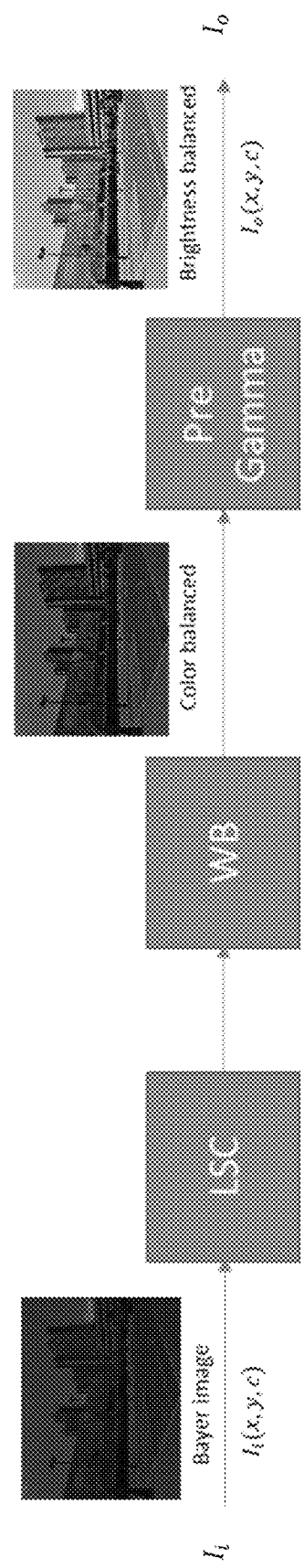
FIG. 4 depicts an LSC input being processed to obtain the pre-gamma output, according to an embodiment.

FIG. 4 depicts the LSC input $I_i$ being processed to obtain the pre-gamma output $I_o$, according to an embodiment.

Referring to FIG. 4, a Bayer pattern may be applied to the input $I_i$. After LSC and WB are performed, a color balanced image may be obtained. In addition, after performing pre-gamma, a brightness balanced image may be obtained as the pre-gamma output $I_o$.

An additional aspect of the disclosure is to implement the HW ISP where a fixed-point (FXP) operation and bit-shift scaling are applied. FXP operation processing may be applied to modify Equation (3), as shown below in Equation (4).

$$I_o(x, y, c) = 2^{d2}\left(\frac{1}{2^{d2}} \frac{W(c)}{2^{d1}} \frac{G(x, y, c)}{2^{d0}} I_i(x, y, c)\right)^{\frac{1}{2.2}} \qquad (4)$$

In Equation (4), d0 is a pre-gamma bit-shift, d1 is a WB bit-shift, and d2 is an LSC bit-shift. Together with bit-shift scaling, elements of each processing function $I_i$ (x,y,c), G(x,y,c), and W(c) have integer numbers.

After obtaining the pre-gamma output $I_o$, the grid gain values G(x,y,c) can be reversely derived using Equation (5).

$$G(x, y, c) = \frac{2^{d0+d1+d2}}{W(c)I_i(x, y, c)}\left(\frac{I_o(x, y, c)}{2^{d2}}\right)^{2.2} \qquad (5)$$

Now assume there is a value of a pre-gamma output that has no chroma shading artifact at all which may be referred to as an "ideal gain" or "ideal grid gain". In FIG. 2, images (a) and (b) have chroma shading artifacts, and therefore have non-flat R/G and B/G curves (c) and (d), respectively. An image with an ideal gain would have the R/G ratio or B/G ratio to always have constant numbers, regardless of pixel positions through the entire area of an image. Denote the ideal pre-gamma output $\tilde{I}_o$. The ideal red and blue channel output with respect to a green channel can be considered as shown in Equation (6) with the same ratio, where K represents a constant.

$$\frac{\tilde{I}_o(x, y, c)}{I_o(x, y, G)} = K(c)\ c \in \{R, B\} \qquad (6)$$

In the image with an ideal gain, pixel values are expressed as shown in Equation (7).

$$\tilde{I}_o(x,y,c)=K(c)I_o(x,y,G) \qquad (7)$$

Thus, by putting the Equation (7) into Equation (4), the ideal grid gain values $\tilde{G}(x,y,c)$ can be estimated as shown in Equation (8).

$$\tilde{G}(x, y, c) = \frac{2^{d0+d1+d2}}{W(c)I_i(x, y, c)}\left(\frac{K(c)I_o(x, y, G)}{2^{d2}}\right)^{2.2} \qquad (8)$$

Once the constants K are determined, the ideal grid gain value $\tilde{G}$ that makes the image entirely free of chroma artifacts can be calculated.

The image with the ideal gain (e.g., the ideal image) is not the final target. More specifically, if the ideal gain is applied as is, it would be representative of only one color ratio applied to the entire area of the image, losing color information.

Figure 5:
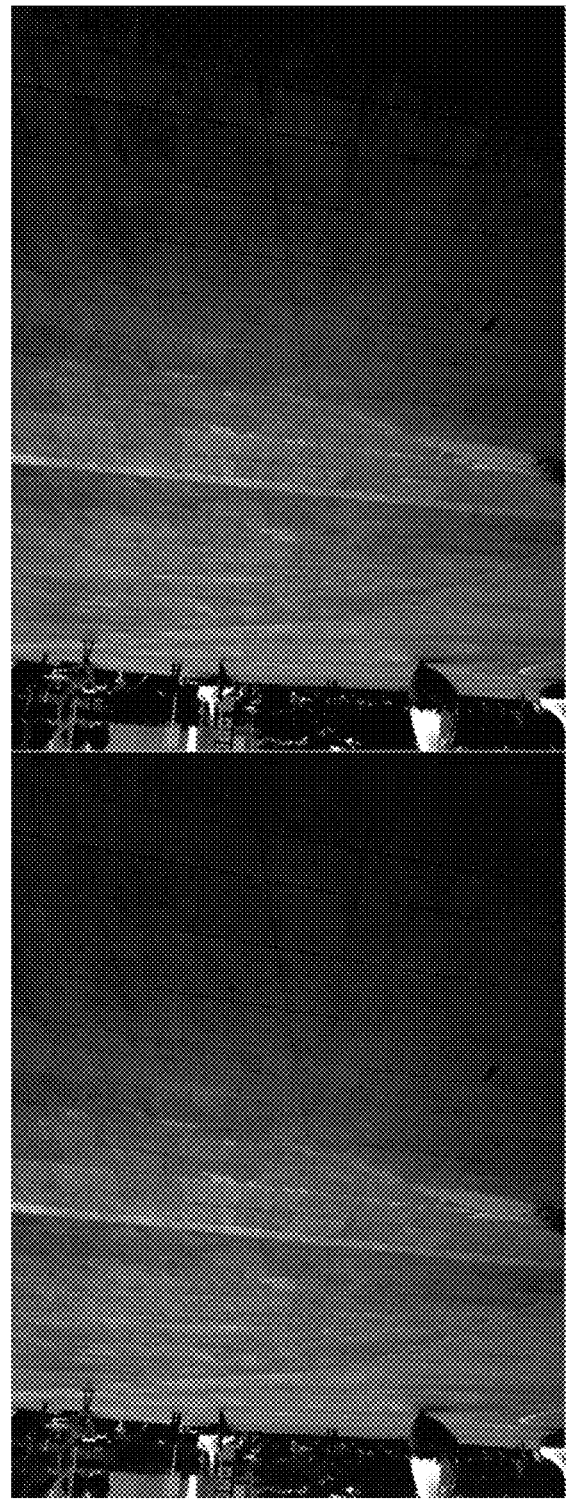
FIG. 5 illustrates an input image applying an original gain and the input image applying an ideal gain, according to an embodiment.

FIG. 5 illustrates an input image applying an original gain and the input image applying an ideal gain, according to an embodiment.

To preserve the color information, the final output gain $G_{new}$ is determined by combining (or merging) the input gain and the ideal gain, as shown in Equation (9).

$$G_{new}(x,y,c)=\beta(x,y)G(x,y,c)+(1-\beta(x,y))\tilde{G}(x,y,c) \quad (9)$$

Although a method for determining $\beta$ will be described in more detail below, the overall idea is that more input gain G is required at colorful regions and more ideal gain $\tilde{G}$ is required at areas where the chroma shading is visible (e.g., less colorful regions). In other words, the input gain G is applied to some areas of an image (e.g., colorful areas) and the ideal gain $\tilde{G}$ is applied to other areas of the image (e.g., less colorful areas).

It is important to choose the constants K(R) and K(B) that are representative of an R/G ratio and B/G ratio for the whole image.

Figure 6:
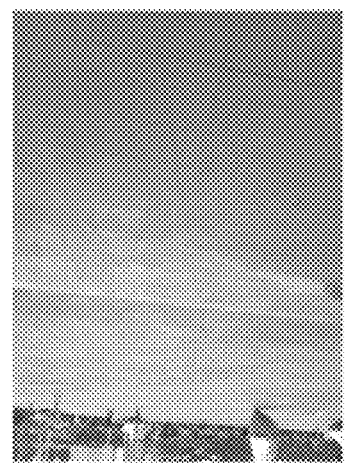
FIG. 6 illustrates separately applying two different ideal gains to an input image, according to an embodiment.
Figure 6:

FIG. 6 illustrates separately applying two different ideal gains to an input image, according to an embodiment.

Referring to FIG. 6, an input image is illustrated on the left-hand side of the figure. If ratios are randomly chosen, like #1 in FIG. 6 (corresponding to (R,G,B)=(177,122,141)), the results would have big color shifts, like image (a) in FIG. 6 (which appears to have a heavy red tint), even if there is no chroma shading artifact with the constant color ratio. However, choosing #2 in FIG. 6 (corresponding to (R,G,B)=(113,118,117)) as the representative ratios is more preferable in that it does not have as significant of an effect on the overall shift in color rendering of the original image, as evidenced by image (b) in FIG. 6.

For this reason, choosing the R/G and B/G ratios that are present across the majority of pixels in the images is preferred. In statistics, the mode of a set of data values is the value that appears the most often. Therefore, the mode of the R/G and B/G ratios should be selected as representative from the pre-gamma output in Equation (4), derived from the thumbnail. Denoting the ratio with respect to the green channel is shown in Equation (10).

$$\hat{R}(x,y) = \frac{I_o(x, y, R)}{I_o(x, y, G)}, \quad \hat{B}(x, y) = \frac{I_o(x, y, B)}{I_o(x, y, G)}, \quad (10)$$

$\hat{R}$ and $\hat{B}$ can be any decimal numbers, but a target of this application is an FXP operation, meaning $\hat{R}$ and $\hat{B}$ are discrete integer numbers. If a thumbnail width is P and a height is Q, by counting the number of $(\hat{R}, \hat{B})$ among a pre-gamma output with P×Q total samples, a two dimensional (2D) histogram can be generated with respect to $\hat{R}$ and $\hat{B}$. $h(\hat{R}, \hat{B})$ may be denoted as the 2D histogram for the R/G ratio and the B/G ratio. Then, the mode values of the R and B channels become the index of the maximum value of $h(\hat{R}, \hat{B})$, as shown in Equation (11).

$$(K(R), K(B)) = \underset{R,B}{\mathrm{argmax}}\, h(\hat{R}, \hat{B}) \quad (11)$$

Because the number of samples P×Q may be too sparse to generate a 2D histogram, and since the thumbnail is a mini version of the full frame, maximum values may not be reliable enough to represent the whole image. Accordingly, mode values of the R and B channels may be obtained by taking a local average $\bar{h}(\hat{R}, \hat{B})$, as shown in Equation (12).

$$\bar{h}(\hat{R}, \hat{B}) = \sum_{n=-N}^{N} \sum_{m=-M}^{M} h(\hat{R}+m, \hat{B}+n) \quad (12)$$

Thus, the representative ratio (K(R), K(B)) may be obtained by Equation (13).

$$(K(R), K(B)) = \underset{R,B}{\mathrm{argmax}}\, \bar{h}(\hat{R}, \hat{B}) \quad (13)$$

As discussed above, the ideal gain is applied to certain portions of an image and the input gain is applied to other portions of the image. Final gain values that are applied to an image are determined by combining ideal gains and input gains to respective regions of the image. Colorful regions of image (e.g., regions of the image having a relatively high difference in a chroma value with respect to an average chroma value of the image), where there are no lens shading artifacts, do not have to use the gain of an ideal image, and may keep input gains that are based on the original pixel values. The chroma shading artifacts are more likely to be visible in the areas of the input image whose color ratios are slightly different from the ideal ratio. Therefore, applying the gain of the ideal image is more likely for less colorful regions of the image (e.g., regions of the image having a relatively low difference in a chroma value with respect to an average chroma value of the image).

"Merging" the ideal and input gains (e.g., applying the ideal gain to some regions of the image and applying the input gain to other regions of the image) may be performed using two steps, a ratio difference step and a gain difference step.

The ratio difference $d_r(x,y)$ may be used as a weight to merge ideal and input gains, as shown in Equation (14).

$$d_r(x, y) = \left|\frac{I_o(x, y, R)}{I_o(x, y, G)} - K(R)\right| + \left|\frac{I_o(x, y, B)}{I_o(x, y, G)} - K(B)\right| \quad (14)$$

Figure 7:
FIG. 7 is a visualization of a ratio difference, according to an embodiment.
Figure 7:
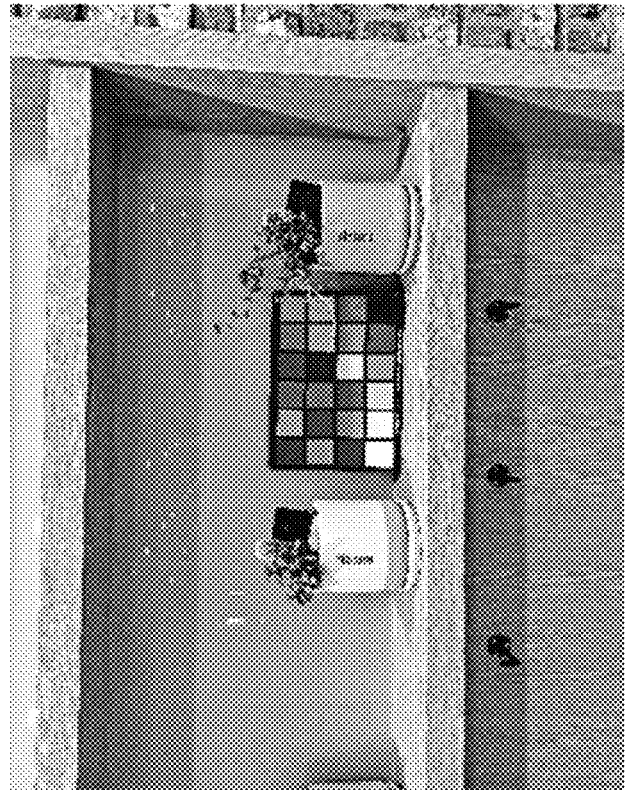

FIG. 7 is a visualization of the ratio difference $d_r(x,y)$, according to an embodiment. The ratio difference $d_r(x,y)$ may be a ratio difference among color channels.

Referring to FIG. 7, an example image (a) illustrates a Macbeth color checker area and green plants. A corresponding ratio difference $d_r(x,y)$ (a linear combination of input gain and ideal gain) is illustrated in (b) of FIG. 7. Ideal and original gains are merged based on Equation (14), such that black/dark regions are more likely to use ideal grid gains, and white/light regions are more likely to use original gains. The merging process introduced by Equation (9) becomes the following Equation (15) and Equation (16):

$$d_r(x,y):=\max(\min(d_r(x,y),d_{r\_max}),d_{r\_min})-d_{r\_min} \quad (15)$$

$$G_{ratio}(x,y,c)=(G(x,y,c)d_r(x,y)+\tilde{G}(x,y,c)(d_{r\_max}-d_{r\_min}-d_r(x,y)))/(d_{r\_max}-d_{r\_min}) \quad (16)$$

In Equations (15) and (16), $d_{r\_max}$ and $d_{r\_min}$ are upper and lower limits, meaning if the ratio difference is beyond a corresponding upper or lower limit, only an input gain is used or only an ideal gain is used.

In addition to the ratio difference step, a gain difference step may also be included to merge the ideal gain with the input gain. If $G_{ratio}$ values are too different from original input gains, despite having small ratio differences, they may be the root cause as to why the final sRGB output image has an unwanted color deviance (e.g., a color shift artifact). Many images may be merged using the ratio difference, but some images may need additional merging techniques to eliminate other side effects. For this reason, a process that continues to apply input gains when the new gain $G_{ratio}$ values are too different from the input gains may be used in accordance with Equations (17)-(19).

$$d_g(x,y,c) = |G_{ratio}(x,y,c) - G(x,y,c)| \quad (17)$$

$$d_g(x,y,c) := \max(\min(d_g(x,y,c), d_{g\_max}), d_{g\_min}) - d_{g\_min} \quad (18)$$

$$G_{out}(x,y,c) = (G(x,y,c) d_g(x,y,c) + G_{ratio}(x,y,c)(d_{g\_max} - d_{g\_min} - d_g(x,y,c)))/(d_{g\_max} - d_{g\_min}) \quad (19)$$

Thus, $G_{out}(x,y,c)$ may be the final gain output in the above two-step merging process.

Figure 8:
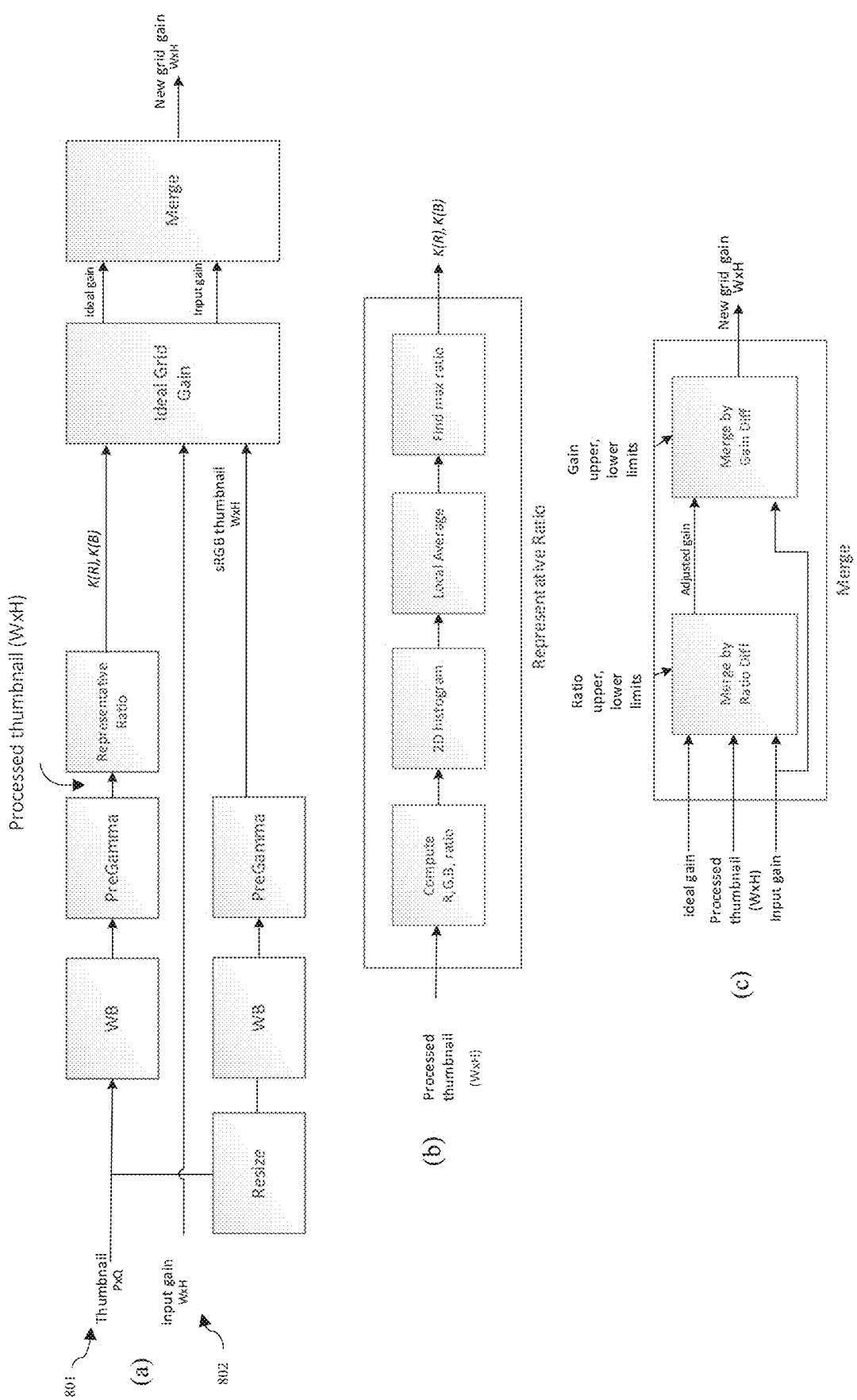
FIG. 8 illustrates an overall block diagram of SD-LSC, according to an embodiment.

FIG. 8 illustrates an overall block diagram of SD-LSC, according to an embodiment.

Referring to (a) of FIG. 8, a Bayer thumbnail 801 and an input grid gain 802 are provided as inputs. The Bayer thumbnail 801 is processed by applying WB and pre-gamma, and the representative ratios K(R), K(B) are computed for the processed thumbnail. In addition, the Bayer thumbnail 801 is also resized (e.g., downsampled) before applying WB and pre-gamma to determine the ideal grid gain because, in general, a grid gain size (W×H) is smaller than thumbnail size (P×Q). Alternatively, the grid gain size may be upsampled to the size of the thumbnail 801 (e.g., P×Q) instead, which could be used to generate better quality images. However, when a low computational complexity is preferred, such as when using a smart phone preview mode or a video recording that needs stable processing in real-time for at least 30 frames per second (fps), thumbnail down-sampling would be a better approach than upsampling. Once the ideal grid gain is obtained, merging the ideal grid gain with the input grid gain is performed to obtain the new (final) grid gains.

Referring to (b) of FIG. 8, the step of calculating the representative ratios K(R), K(B), is expanded upon. That is, in order to compute the representative ratios K(R), K(B), the processed thumbnail is used to compute R, G, and B ratios. For example, as explained above with reference to Equation (10), an R/G and B/G ratio that is most likely to appear across the majority of pixels (e.g., a mode) is selected to calculate $\hat{R}$ and $\hat{B}$. Then, as explained above with reference to Equation (11), $\hat{R}$ and $\hat{B}$ is used to generate a 2D histogram $h(\hat{R}, \hat{B})$. Further, as explained above with reference to Equation (12), a local average $\bar{h}(\hat{R}, \hat{B})$ of the 2D histogram is determined, and as explained above with reference to Equation (13), a maximum ratio of the local average $\bar{h}(\hat{R}, \hat{B})$ is used to calculate the representative ratio K(R), K(B)).

Referring to (c) of FIG. 8, the step of merging the ideal gain with the input gain is expanded upon. As explained above, one or both of the ratio difference and/or the gain difference are used to merge the ideal gain with the input gain.

The ratio difference $d_r(x,y)$ is used as a weight to merge ideal and input gains, as shown in Equation (14). If the ratio difference $d_r(x,y)$ is beyond a corresponding upper limit $d_{r\_max}$ or lower limit $d_{r\_min}$, only an input gain is used or only an ideal gain is used.

In addition to the ratio difference step, a gain difference step may also be used to merge the ideal gain with the input gain. If adjusted gain values $G_{ratio}$ based on the ratio difference $d_r(x,y)$ are too different from original input gains $G(x,y,c)$, then original input gain values may be used instead of adjusted gain values, as explained above with reference to Equations (17)-(19).

Figure 9:
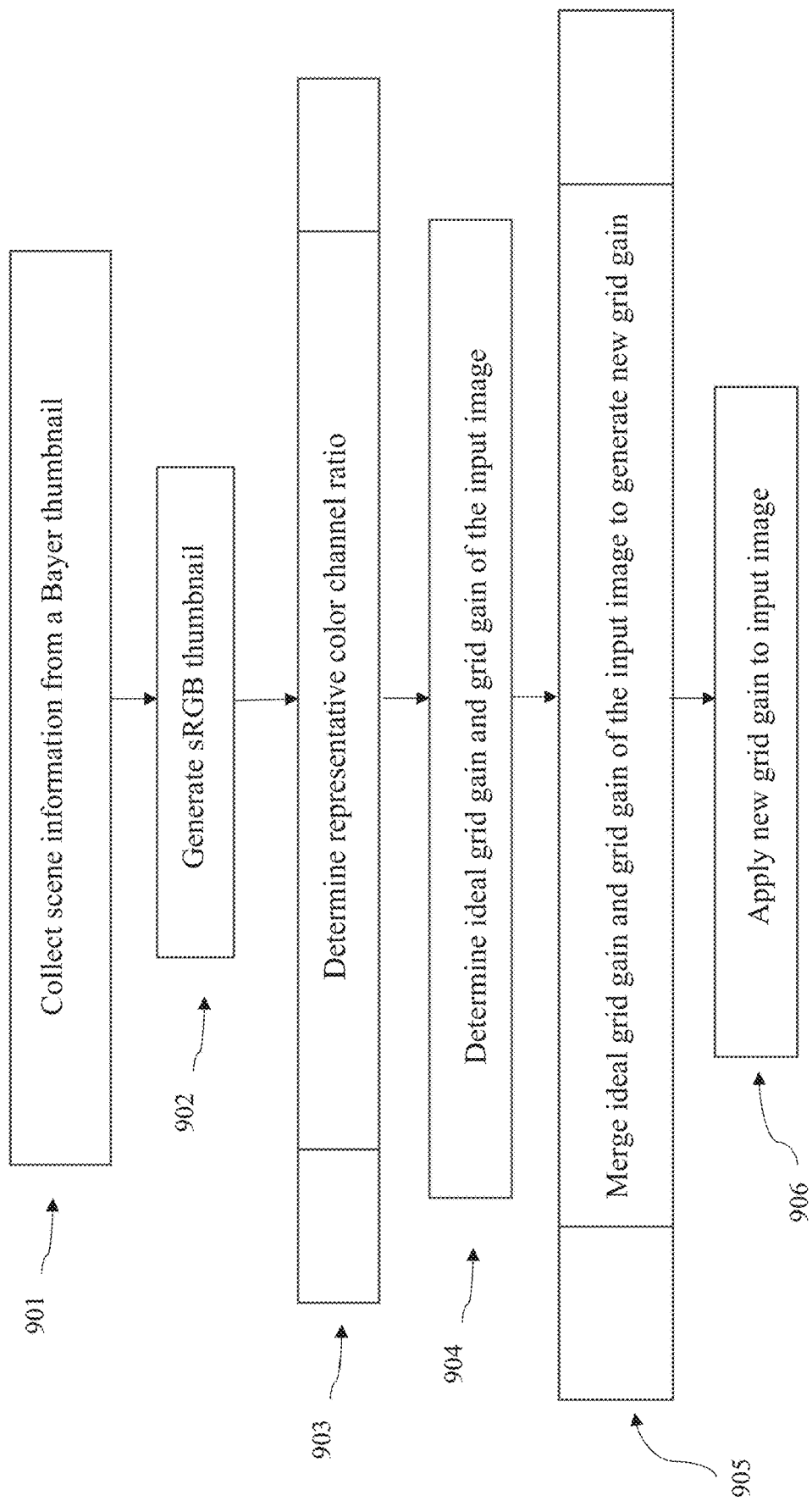
FIG. 9 illustrates a flowchart for performing SD-LSC, according to an embodiment.

FIG. 9 illustrates a flowchart for performing SD-LSC, according to an embodiment.

The steps illustrated in FIG. 9 may be performed in an alternate order and/or some steps may be omitted, and other additional steps may be added. In addition, the steps illustrated in FIG. 9 may be stored as instructions and performed by a processor.

Referring to FIG. 9, in step 901, scene information is collected from a Bayer thumbnail of an input image. For example, the scene information may be collected by applying at least one 3A statistical algorithm to the Bayer thumbnail, as discussed above.

In step 902, an sRGB thumbnail is generated by processing the Bayer thumbnail to simulate WB and/or pre-gamma blocks. For example, after WB is performed, a color balanced image may be obtained. In addition, after performing pre-gamma, a brightness balanced image may be obtained as the pre-gamma output.

In step 903, a representative color channel ratio of the input image is determined (e.g., calculated or computed) based on the scene information and the sRGB thumbnail. Step 903 will be discussed further with reference to FIG. 10, below.

In step 904, an ideal grid gain of the input image is determined based on the representative color channel ratio and a grid gain of the input image. For example, the ideal grid gain can be calculated using Equation (8), above, and the grid gain of the input image may be provided as input.

In step 905, the ideal grid gain and the grid gain of the input image are merged to generate a new grid gain. Step 905 will be discussed further with reference to FIG. 11, below.

In step 905, the new grid gain is applied to an image (e.g., the input image).

Figure 10:
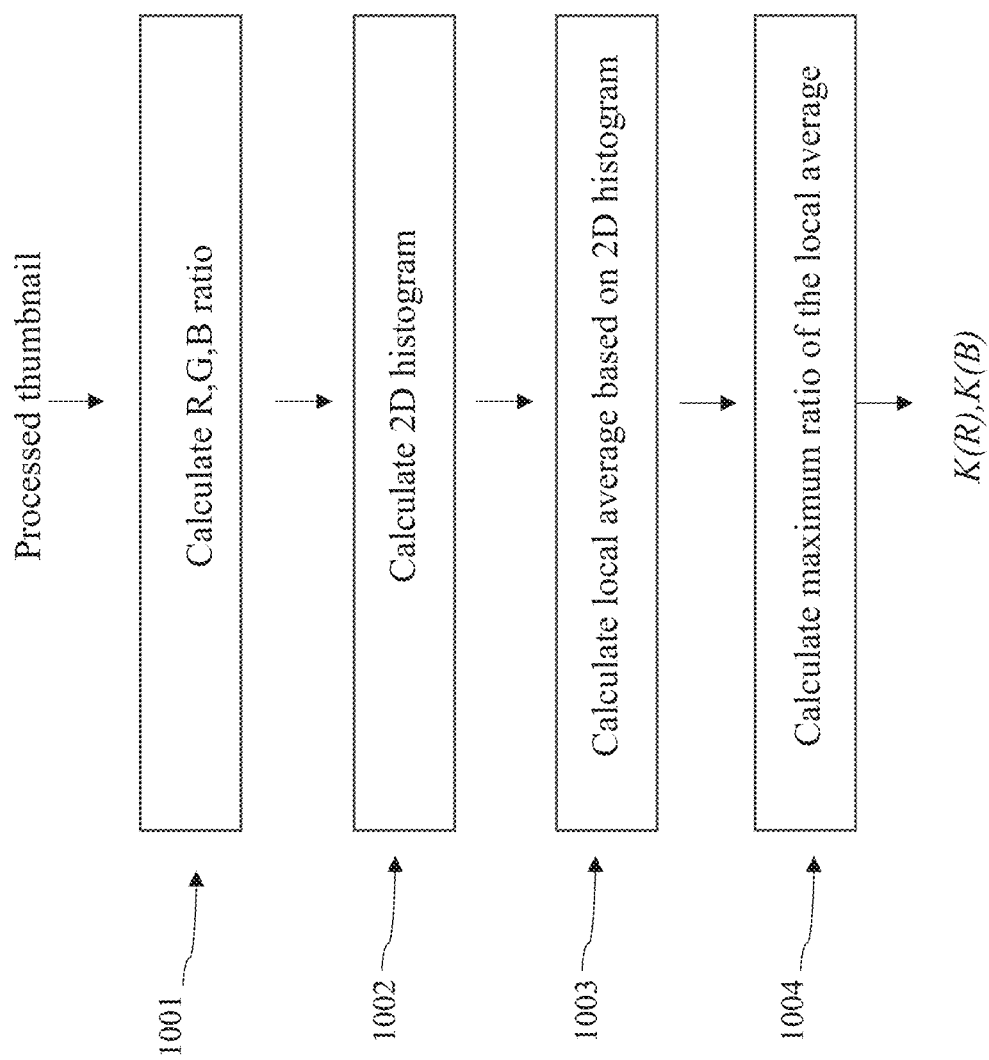
FIG. 10 illustrates a flowchart for determining a representative color channel ratio corresponding to step 903 in FIG. 9, according to an embodiment.

FIG. 10 illustrates a flowchart for determining a representative color channel ratio corresponding to step 903 in FIG. 9, according to an embodiment.

The steps illustrated in FIG. 10 may be performed in an alternate order and/or some steps may be omitted, and other additional steps may be added. In addition, the steps illustrated in FIG. 10 may be stored as instructions and performed by a processor.

Referring to FIG. 10, a processed thumbnail is provided as input. The processed thumbnail may be assumed to have undergone WB and/or pre-gamma processing and may correspond to the pre-gamma output $I_o$, as shown in FIG. 4.

In step 1001, an R,G,B ratio is calculated. For example, as explained above with reference to Equation (10), a color ratio that is most likely to appear across the majority of pixels (e.g., a mode) may be calculated.

In step 1002, a 2D histogram is calculated. For example, the 2D histogram of a color ratio (e.g., R/G) can be calculated with respect to mean values of a color (e.g., $\hat{R}$ and $\hat{B}$) over the entirety of an image.

In step 1003, a local average using the 2D histogram is calculated. In addition, as explained above with reference to Equation (13), a maximum ratio of the local average is used to calculate the representative ratio K(R), K(B) (e.g., a representative color ratio) in step 1004.

Further, the representative ratio K(R), K(B) may be used to calculate the ideal gain.

Figure 11:
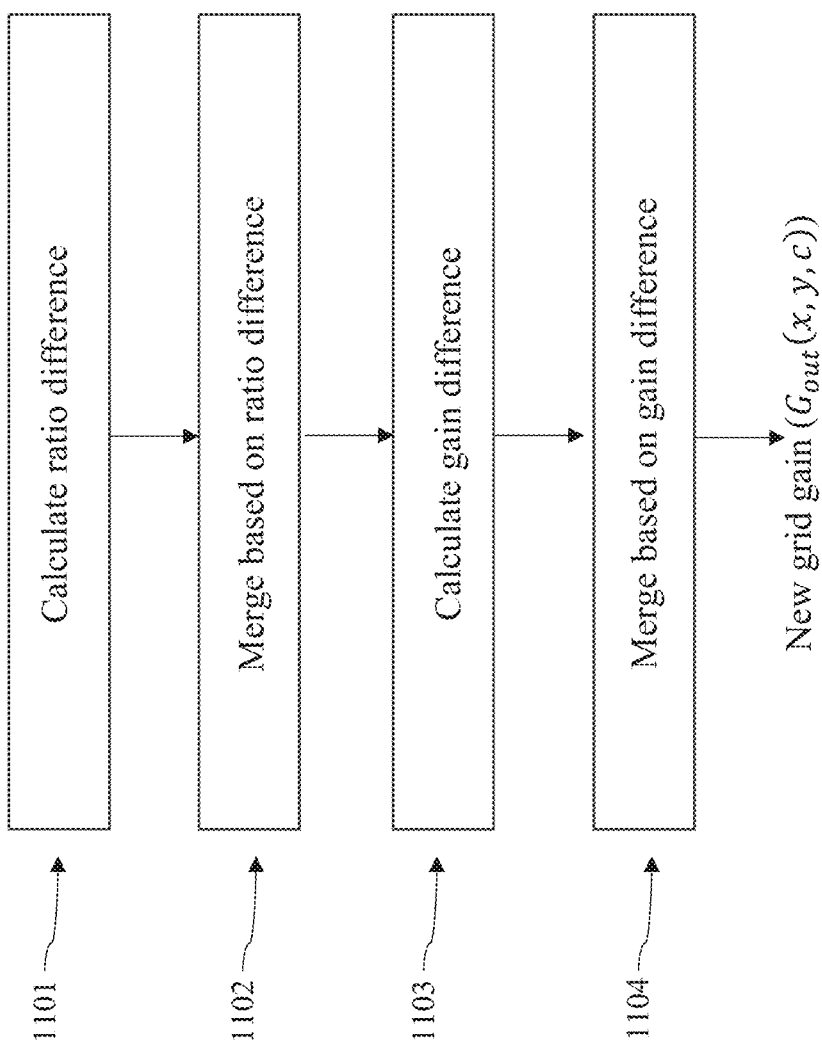
FIG. 11 illustrates a flowchart for merging the ideal grid gain and the grid gain of the input image corresponding to step 905 in FIG. 9, according to an embodiment.

FIG. 11 illustrates a flowchart for merging the ideal grid gain and the grid gain of the input image corresponding to step 905 in FIG. 9, according to an embodiment.

The steps illustrated in FIG. 11 may be performed in an alternate order and/or some steps may be omitted, and other additional steps may be added. In addition, the steps illustrated in FIG. 11 may be stored as instructions and performed by a processor.

The ideal and input gains may be merged (e.g., applying the ideal gain to some regions of the image and applying the input gain to other regions of the image) using two steps, a ratio difference step and a gain difference step. Steps 1101-1102 correspond to a ratio difference step and steps 1103-1104 correspond to a gain difference step.

Referring to FIG. 11, in step 1101, a ratio difference is calculated. The ratio difference may be a linear combination of the input gain and ideal gain. In step 1102, the ratio difference is merged. For example, the ideal gains and the input gains may be merged based on Equation (14), above, such that adjusted gain values may be used based on the ratio difference.

In step 1103, a gain difference is calculated. If the merged gain values (calculated in step 1102) are too different from the original input gains, then in step 1104, the gain difference is merged such that the original input gain values may be used instead of adjusted gain values, as explained above with reference to Equations (17)-(19).

Figure 12:
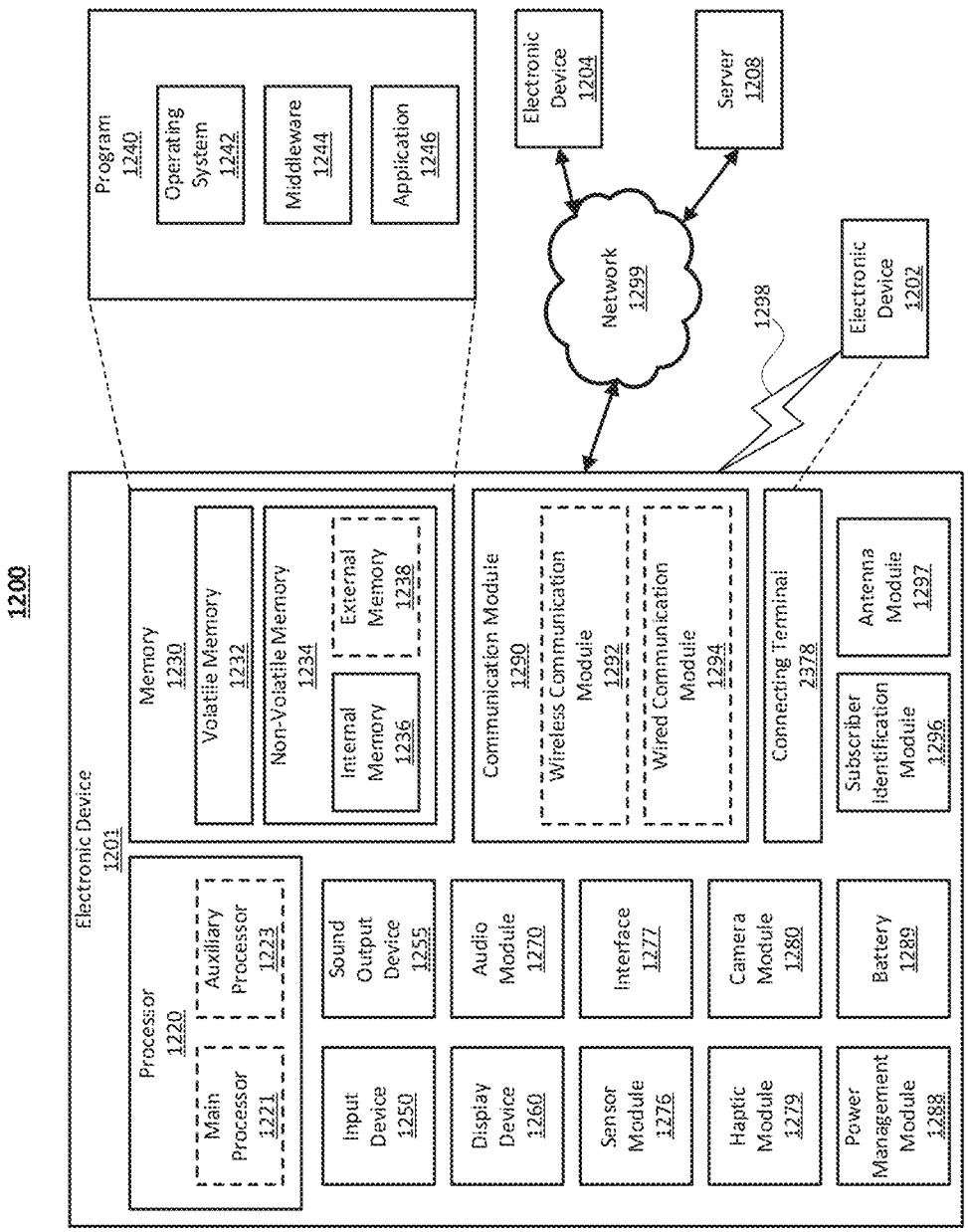
FIG. 12 illustrates a block diagram of an electronic device in a network environment, according to one embodiment.

FIG. 12 illustrates an electronic device in a network environment, according to an embodiment.

Referring to FIG. 12, the electronic device 1201, e.g., a mobile terminal including GPS functionality, in the network environment 1200 may communicate with an electronic device 1202 via a first network 1298 (e.g., a short-range wireless communication network), or an electronic device 1204 or a server 1208 via a second network 1299 (e.g., a long-range wireless communication network). The electronic device 1201 may communicate with the electronic device 1204 via the server 1208. The electronic device 1201 may include a processor 1220, a memory 1230, an input device 1250, a sound output device 1255, a display device 1260, an audio module 1270, a sensor module 1276, an interface 1277, a haptic module 1279, a camera module 1280, a power management module 1288, a battery 1289, a communication module 1290, a subscriber identification module (SIM) 1296, or an antenna module 1297 including a GNSS antenna. In one embodiment, at least one (e.g., the display device 1260 or the camera module 1280) of the components may be omitted from the electronic device 1201, or one or more other components may be added to the electronic device 1201. In one embodiment, some of the components may be implemented as a single integrated circuit (IC). For example, the sensor module 1276 (e.g., a fingerprint sensor, an iris sensor, or an illuminance sensor) may be embedded in the display device 1260 (e.g., a display).

The processor 1220 may execute, for example, software (e.g., a program 1240) to control at least one other component (e.g., a hardware or a software component) of the electronic device 1201 coupled with the processor 1220, and may perform various data processing or computations. As at least part of the data processing or computations, the processor 1220 may load a command or data received from another component (e.g., the sensor module 1276 or the communication module 1290) in volatile memory 1232, process the command or the data stored in the volatile memory 1232, and store resulting data in non-volatile memory 1234. The processor 1220 may include a main processor 1221 (e.g., a central processing unit (CPU) or an application processor, and an auxiliary processor 1223 (e.g., a graphics processing unit (GPU), an image signal processor (ISP), a sensor hub processor, or a communication processor (CP)) that is operable independently from, or in conjunction with, the main processor 1221. Additionally or alternatively, the auxiliary processor 1223 may be adapted to consume less power than the main processor 1221, or execute a particular function. The auxiliary processor 1223 may be implemented as being separate from, or a part of, the main processor 1221.

The auxiliary processor 1223 may control at least some of the functions or states related to at least one component (e.g., the display device 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to one embodiment, the auxiliary processor 1223 (e.g., an image signal processor or a communication processor) may be implemented as part of another component (e.g., the camera module 1280 or the communication module 1290) functionally related to the auxiliary processor 1223.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input device 1250 may receive a command or data to be used by another component (e.g., the processor 1220) of the electronic device 1201, from the outside (e.g., a user) of the electronic device 1201. The input device 1250 may include, for example, a microphone, a mouse, or a keyboard.

The sound output device 1255 may output sound signals to the outside of the electronic device 1201. The sound output device 1255 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 1260 may visually provide information to the outside (e.g., a user) of the electronic device 1201. The display device 1260 may include, for example, a display, a hologram device, or a projector and control circuitry to control a corresponding one of the display, hologram device, and projector. According to one embodiment, the display device 1260 may include touch circuitry adapted to detect a touch, or sensor circuitry (e.g., a pressure sensor) adapted to measure the intensity of force incurred by the touch.

The audio module 1270 may convert a sound into an electrical signal and vice versa. According to one embodiment, the audio module 1270 may obtain the sound via the input device 1250, or output the sound via the sound output device 1255 or a headphone of an external electronic device 1202 directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. The sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device 1202 directly (e.g., wiredly) or wirelessly. According to one embodiment, the interface 1277 may include, for example, a high-definition multimedia interface (HDMI), a universal serial bus (USB) interface, a secure digital (SD) card interface, or an audio interface.

A connecting terminal 1278 may include a connector via which the electronic device 1201 may be physically connected with the external electronic device 1202. According to one embodiment, the connecting terminal 1278 may include, for example, an HDMI connector, a USB connector, an SD card connector, or an audio connector (e.g., a headphone connector).

The haptic module 1279 may convert an electrical signal into a mechanical stimulus (e.g., a vibration or a movement) or an electrical stimulus which may be recognized by a user via tactile sensation or kinesthetic sensation. According to one embodiment, the haptic module 1279 may include, for example, a motor, a piezoelectric element, or an electrical stimulator.

The camera module 1280 may capture a still image or moving images. According to one embodiment, the camera module 1280 may include one or more lenses, image sensors, image signal processors, or flashes.

The power management module 1288 may manage power supplied to the electronic device 1201. The power management module 1288 may be implemented as at least part of, for example, a power management integrated circuit (PMIC).

The battery 1289 may supply power to at least one component of the electronic device 1201. According to one embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor) and supports a direct (e.g., wired) communication or a wireless communication. According to one embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or a standard of the Infrared Data Association (IrDA)) or the second network 1299 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The antenna module 1297 may transmit or receive a signal or power to or from the outside (e.g., the external electronic device) of the electronic device 1201. According to one embodiment, the antenna module 1297 may include one or more antennas, and, therefrom, at least one antenna appropriate for a communication scheme used in the communication network, such as the first network 1298 or the second network 1299, may be selected, for example, by the communication module 1290 (e.g., the wireless communication module 1292). The signal or the power may then be transmitted or received between the communication module 1290 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 1201 and the external electronic device 1204 via the server 1208 coupled with the second network 1299. Each of the electronic devices 1202 and 1204 may be a device of a same type as, or a different type, from the electronic device 1201. All or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, or client-server computing technology may be used, for example.

One embodiment may be implemented as software (e.g., the program 1240) including one or more instructions that are stored in a storage medium (e.g., internal memory 1236 or external memory 1238) that is readable by a machine (e.g., the electronic device 1201). For example, a processor of the electronic device 1201 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

The invention claimed is:

1. A method of performing scene-dependent lens shading correction (SD-LSC), the method comprising:
    collecting scene information from a Bayer thumbnail of an input image;
    generating a standard red green blue (sRGB) thumbnail by processing the Bayer thumbnail of the input image to simulate white balance (WB) and pre-gamma blocks;
    determining a representative color channel ratio of the input image based on the scene information and the sRGB thumbnail;
    determining an ideal grid gain of the input image based on the representative color channel ratio and a grid gain of the input image;
    merging the ideal grid gain and the grid gain of the input image to generate a new grid gain; and
    applying the new grid gain to the input image.

2. The method of claim 1, wherein the Bayer thumbnail is generated from a previous frame of the input image.

3. The method of claim 2, wherein the grid gain of the input image is based on a present frame of the input image.

4. The method of claim 1, further comprising resizing the sRGB thumbnail before determining the ideal grid gain.

5. The method of claim 1, wherein the representative color channel ratio is determined using at least one two-dimensional (2D) histogram of an R/G ratio, B/G ratio, B/R ratio, G/R ratio, R/B ratio or G/B ratio.

6. The method of claim 5, wherein a mode value of at least one of an R channel, B channel, or G channel is used to determine a maximum value of the at least one 2D histogram.

7. The method of claim 6, wherein the mode value of at least one of the R channel, B channel, or G channel is determined using a local average of the 2D histogram.

8. The method of claim 1, wherein the new grid gain is generated such that the grid gain of the input image is applied to more colorful regions of the input image and the ideal grid gain is applied to less colorful regions of the input image.

9. The method of claim 1, wherein merging the ideal grid gain and the grid gain of the input image comprises applying upper and lower limits to a ratio difference of a linear combination with respect to a color channel for the ideal grid gain and the grid gain of the input image.

10. The method of claim 9, wherein merging the ideal grid gain and the grid gain of the input image further comprises applying upper and lower limits to a gain difference between the ideal grid gain and the grid gain of the input image.

11. A system for performing scene-dependent lens shading correction (SD-LSC), the system comprising:
    a memory configured to store instructions; and
    a processor configured to execute the instructions stored in the memory which, upon execution, cause the processor to:
        collect scene information from a Bayer thumbnail of an input image;
        generate a standard red green blue (sRGB) thumbnail by processing the Bayer thumbnail of the input image to simulate white balance (WB) and pre-gamma blocks;
        determine a representative color channel ratio of the input image based on the scene information and the sRGB thumbnail;
        determine an ideal grid gain of the input image based on the representative color channel ratio and a grid gain of the input image;
        merge the ideal grid gain and the grid gain of the input image to generate a new grid gain; and
        apply the new grid gain to the input image.

12. The system of claim 11, wherein the Bayer thumbnail is generated from a previous frame of the input image.

13. The system of claim 12, wherein the grid gain of the input image is based on a present frame of the input image.

14. The system of claim 11, wherein the sRGB thumbnail is resized before computing the ideal grid gain.

15. The system of claim 11, wherein the representative color channel ratio is computed using at least one two-dimensional (2D) histogram of an R/G ratio, B/G ratio, B/R ratio, G/R ratio, R/B ratio or GB ratio.

16. The system of claim 15, wherein a mode value of at least one of an R channel, B channel, or G channel is used to calculate a maximum value of the at least one 2D histogram.

17. The system of claim 16, wherein the mode value of at least one of the R channel, B channel, or G channel is calculated using a local average of the 2D histogram.

18. The system of claim 11, wherein the new grid gain is generated such that the grid gain of the input image is applied to more colorful regions of the input image and the ideal grid gain is applied to less colorful regions of the input image.

19. The system of claim 11, wherein merging the ideal grid gain and the grid gain of the input image comprises applying upper and lower limits to a ratio difference of a linear combination with respect to a color channel for the ideal grid gain and the grid gain of the input image.

20. The system of claim 19, wherein merging the ideal grid gain and the grid gain of the input image further comprises applying upper and lower limits to a gain difference between the ideal grid gain and the grid gain of the input image.

\* \* \* \* \*